United States Patent [19]

De Bonis

[11] 4,066,281

[45] Jan. 3, 1978

[54] PORSCHE AUTOMOBILE OIL DRAIN REPLACEMENT TUBE

[76] Inventor: John C. De Bonis, 9591 Rocky Mountain Drive, Huntington Beach, Calif. 92646

[21] Appl. No.: 705,978

[22] Filed: July 16, 1976

[51] Int. Cl.² ............................................. F16L 21/00
[52] U.S. Cl. .................. 285/31; 29/156.4 R; 29/451; 285/302; 285/321; 285/351
[58] Field of Search ...................... 285/19, 20, 31, 32, 285/347, 61, 62, 64, 302, 298, 321, 351, DIG. 7; 123/56 A, 56 AA, 56 AB, 56 AL; 184/1.5 R; 29/157 R, 156.4, 451, 428

[56] References Cited

U.S. PATENT DOCUMENTS

| 2,298,119 | 10/1942 | Gebert | 285/302 X |
| 2,538,683 | 1/1951 | Guiler et al. | 285/DIG. 7 |
| 2,646,294 | 7/1953 | Anderson | 285/165 |
| 3,889,199 | 8/1975 | Garey | 285/321 X |

FOREIGN PATENT DOCUMENTS

| 1,574,082 | 7/1969 | France | 285/31 |
| 578,940 | 7/1946 | United Kingdom | 123/56 AL |
| 778,365 | 7/1957 | United Kingdom | 285/19 |
| 1,117,802 | 6/1968 | United Kingdom | 285/31 |

Primary Examiner—Dave W. Arola
Attorney, Agent, or Firm—Knobbe, Martens, Olson, Hubbard & Bear

[57] ABSTRACT

A replacement oil drain tube for interconnecting the head and crankcase on a Porsche automobile engine permits the repair of such engines through a replacement of standard, single piece oil drain tubes with a telescoping oil drain tube assembly, eliminating the requirement that the cylinder head be removed from the engine for such repair.

6 Claims, 3 Drawing Figures

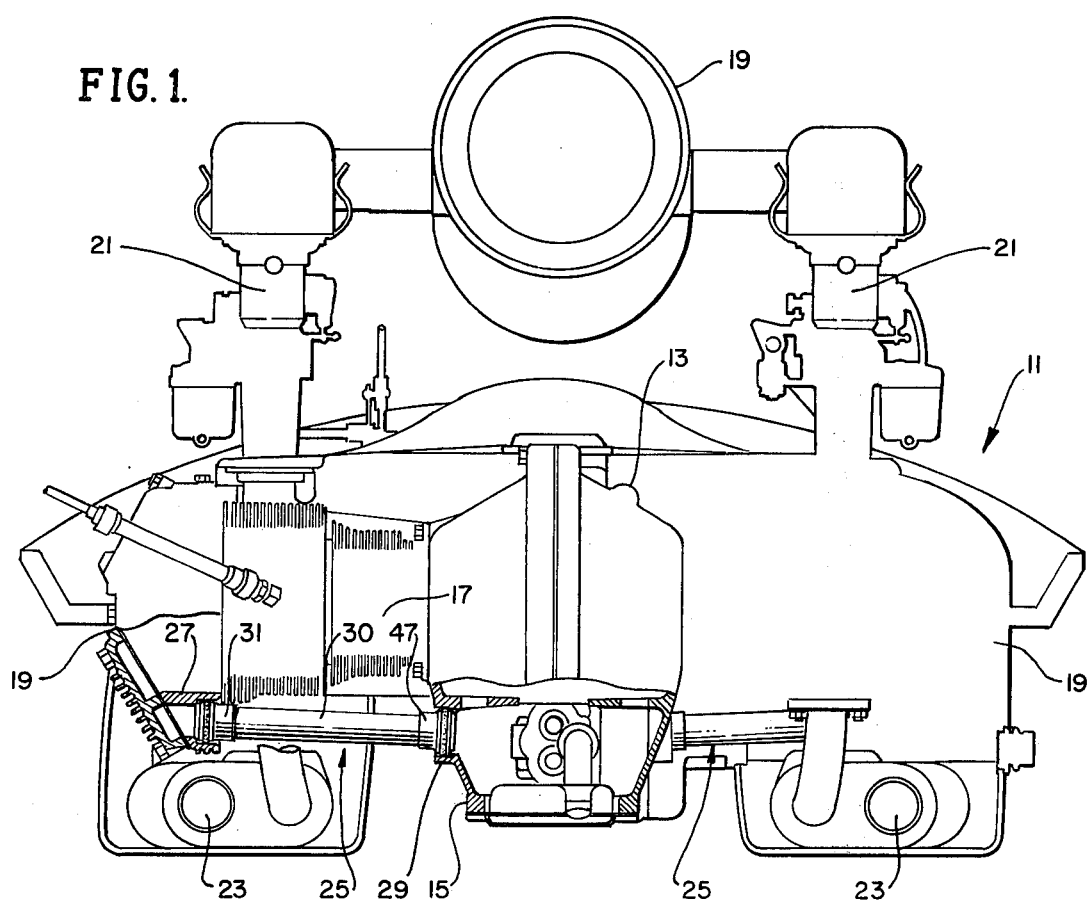

PORSCHE AUTOMOBILE OIL DRAIN REPLACEMENT TUBE

BACKGROUND OF THE INVENTION

The present invention relates to apparatus and methods for the repair of Porsche automobile engines and, more particularly, to a replacement oil drain tube for fitting between the cylinder head and crankcase of such engines, the replacement tube being designed for installation on such engines without the removal of the cylinder head.

Porsche automobile engines are opposed cylinder, air cooled engines including a main engine block incorporating a crankcase and its associated crankshaft and fitted with opposed, outwardly extending cylinder assemblies fitted with cylinder heads mounting overhead cam shafts, rocker arms, and valve assemblies. These elements within the cylinder head assembly are pressure lubricated, leading to an accumulation of oil which drains to the crankcase through plural oil drain tubes. The tubes interconnect the head assembly and crankcase, outboard of and below the cylinder assemblies. These engines are designed with exhaust manifold assemblies positioned below the cylinder and head assemblies, further outboard from the cylinder than the oil drain tubes, so that the oil drain tubes are positioned between these manifolds and the engine cylinders. As a consequence, the oil drain tubes supplied by the manufacturer are subject to extremely high temperatures and large temperature fluctuations. The tubes are sealed, using gasket material, to both the engine crankcase and head assembly, and the seals, as well as the oil drain tubes themselves, are subject to failure and resultant oil leakage.

In the case of this particular engine, such oil leakage is particularly objectionable, since the oil commonly leaks onto the hot exhaust manifold where it burns, creating smoke and fumes.

In the past, repair of failing oil drain tubes has required the removal of the cylinder head assembly, so that even though the oil drain tubes themselves are a relatively inexpensive replacement part, the labor cost involved in repairing oil leaks is quite high.

SUMMARY OF THE INVENTION

The present invention alleviates the requirement for cylinder head removal in repair of leaking Porsche oil drain tubes by providing a unique drain tube design, thus eliminating most of the labor cost involved in making the repair.

Standard oil drain tubes supplied by the engine manufacturer comprise a hollow cylindrical tube fitted with a pair of external O-rings at opposite ends. These O-rings are each confined by a pair of annular ribs extending circumferentially around the ends of the tube to form an annular groove conforming to the O-ring cross section. The cylinder head assembly is provided with an outlet port having a circular aperture for fitting tightly with the O-ring at one end of standard oil drain tube. This circular opening extends from the end of the outlet to a shoulder which confines the oil drain tube from vibrating in an axial direction toward the cylinder head assembly. Similarly, the crankcase of the engine includes an inlet formed as a circular aperture for tightly fitting with the O-ring at the remaining end of the tube, and provided with a shoulder to prohibit the oil drain tube from vibrating axially toward the engine crankcase. Thus, the pair of shoulders retains the axial position of the standard oil drain tube while the pair of ports on the cylinder head assembly and crankcase are sized to seal with the O-ring at opposite ends of the tube. This construction has prohibited the replacement of such oil drain tubes in the prior art without the removal of the cylinder head from the main engine block, since the oil drain tube cannot be moved axially toward either end beyond the location in which it is to permanently reside, the shoulders prohibiting such movement.

The present invention involves a novel construction for a replacement oil drain tube which permits the O-ring at one end of the tube to slide or telescope along the tube. The main oil drain tube is maintained at the standard length, so that when assembly is completed the oil drain tube does not fit further into the cylinder head or engine block than does the standard tube. Placing the O-ring on a sliding assembly, however, permits the central portion of one end of the tube to be extended beyond the shoulder in the cylinder head during assembly, so that sufficient clearance is provided at the engine block end of the replacement oil drain tube to allow it to be rotated into position. After such positioning, the O-ring sliding assembly can be telescoped into position to seal with the cylinder head, at the same time engaging O-rings positioned around the outside of the oil drain tube to seal the telescoping elements.

When assembly is completed, the oil drain tube, which is subjected to substantial vibration during engine operation, still extends completely as a unitary item into both the cylinder head and the engine block, which would not be possible if a telescoping interconnection were placed somewhere along the length of the replacement tubes. The telescoping member thus has the effect of reducing the diameter at one end of the drain tube to allow it to be inserted beyond the shoulder in the cylinder head to provide clearance for insertion. After the telescoping member has been positioned in its final location and held by a stop, the structural integrity of the oil drain tube is equal to that of the original part.

These and other advantages of the invention are best understood through the detailed description which follows. This description references the drawings, in which:

FIG. 1 is a lateral, schematic, sectional view through a Porsche automobile engine with a replacement oil drain tube in accordance with the present invention installed;

FIG. 2 is a contracted elevation view of the oil drain tube of the present invention during assembly with the Porsche engine of FIG. 1 and showing sectional views of the interconnecting apertures for the oil drain tube at the engine crankcase and cylinder head; and FIG. 3 is a contracted elevation view, partially in section, of the oil drain tube of the present invention installed in the apertures of the crankcase and cylinder head of FIG. 1.

DETAILED DESCRIPTION OF THE PREFERRED EMBODIMENT

Referring initially to FIG. 1, a Porsche automobile engine 11 is shown schematically by way of a lateral sectional view. The major engine components include a main engine block 13, including its crankcase 15 to which is bolted plural, laterally extending, opposed cylinders 17. An air cleaner 19 and carburetors 21 supply fuel and air to the intake manifold, while exhaust manifolds 23 duct exhaust gases beneath the engine to a tail pipe.

Attached to the outer ends of the cylinders 17 are cylinder head assemblies 19 which enclose the cam shafts, rocker arms and valve springs. These elements within the cylinder heads 19 are pressure lubricated with oil drawn from the crankcase 15, which oil, after running from the mechanisms within the cylinder heads 19, is returned to the crankcase 15 through plural oil drain tubes 25.

These tubes 25 are inclined toward the crankcase 15 so that return oil will flow by gravity to the crankcase 15. The tubes 25 are located below and outboard of the cylinders 17 and positioned between these cylinders 17 and the exhaust manifolds 23. Because of this placement, the tubes 25 are subjected to very high temperatures and large temperature gradients during engine operation. In addition, due to temperature expansion of the engine parts and vibration during engine operation, the tubes 25 and their sealing fittings are subjected to substantial movement and vibration during use. Both the temperature variations and mechanical motion tend to limit the life of sealing members used to seal the tubes 25 to the cylinder heads 19 and crankcase 15, ultimately causing failure and leakage of these members. It can be seen from FIG. 1 that oil leaking from either end of the tubes 25, and particularly from the end fitted into the cylinder heads 19, can cause leaking oil to drip on the exhaust manifolds 23, creating fumes and smoke.

At the cylinder head end of the tubes 25, the tubes 25 are fitted into a circular aperture 27 in fluid communication with the interior of the cylinder head 19. Similarly, at the crankcase end of the tubes 25, an aperture 29 is provided in the crankcase 15 for mounting this end of the tubes 25.

The replacement oil drain tube 25 shown in FIG. 1 includes a main body section 30 and telescoping section 31 adapted to move axially relative one another, as will be described in more detail below.

Referring now to FIG. 2, the details of the replacement oil drain tube 25, cylinder head aperture 27, and crankcase aperture 29 will be described. The cylinder head aperture 27 is formed as a hollow tubular member including a shoulder 33 separating a large diameter external tubular portion 35 from a smaller diameter internal tubular portion 37. Similarly, the crankcase aperture 29 is formed as a tubular element including an internal shoulder 39 separating a large diameter outer tubular portion 41 from a smaller diameter internal tubular portion 43. The axes of the apertures 27 and 29 are aligned for receiving the oil drain tube 25. The main body section 30 of the oil drain tube 25 comprises a hollow tubular member 45 constructed, for example, of aluminum. The tube 45 is formed unitarily with an enlarged end portion 47 which includes a pair of extending, circumferential ribs 49, axially spaced to support a resilient O-ring 51. The end 47 of the tube 45 is similar in construction to the original oil drain tube 25 supplied with Porsche automobile engines. Thus, as shown in FIG. 3. the resilient O-ring 51 is sized to seal tightly within the aperture 41 and the outer rib 49 has a larger diameter than the aperture 43. Thus, the outer rib 49 can abut the shoulder 39 to prohibit the tube 25 from moving axially toward the crankcase 15.

It will be understood that a unitarily formed end identical to the end 47 exists also at the other end of the standard oil drain tube 25. In the present invention, however, the remaining end of the tube 45, as shown in FIGS. 2 and 3, includes three axially spaced, circumferential grooves 53, 55 and 57. The latter two grooves 55, 57 are sized to receive a pair of sealing, resilient O-rings 59 and 61, respectively, whereas the former groove 53 is designed to receive a resilient split ring 63.

The telescoping section 31 is formed with identical external contours at the end 47, and thus includes a pair of extending, axially spaced, circumferential ribs 65 and 67 for seating a resilient O-ring 69. The telescoping member 31, however, is formed to have a smooth inside diameter sized slightly larger than the outside diameter of the tube 45. As shown in FIG. 3, with the telescoping member 31 extended to the end of the tube 45 and the split ring 63 positioned in the groove 53 to maintain the telescoping member 31 in this extending position, the O-ring 69 seats tightly within the tubular portion 35 of the aperture 27 and, in a manner identical to the other end 47, the rib 67 can abut the shoulder 33 of aperture 27 to prohibit the tube 45 from moving axially toward the cylinder head 19.

The outer diameter of the tube 45 is selected to be smaller than the inside diameter of the tubular portion 37 of aperture 27 in the cylinder head 19, so that, with the telescoping member 31 positioned away from the end of the tube 45 as shown in FIG. 2, the end of the tube 45 including the O-rings 59, 61 can be positioned within the tubular portion 37 of the aperture 27 to permit installation in a manner which will be described in detail below.

It will be understood that, with a standard oil drain tube having identical ends such as the end 27, the ribs 49 and 67 prohibit axial motion of the tube 25 in either direction. Thus, referring to FIG. 1, it is impossible to replace the tube 25 without removal of the cylinder head 19, incurring substantial labor costs. The present tube 25, however, permits replacement of the tube 25 without removal of the cylinder head 19. This is accomplished as follows.

Initially, the old, damaged tube 25 is removed from the engine, for example by cutting the central section of the tube 25 away so that each end of the tube may be withdrawn axially from the apertures 27 and 29. Referring to FIG. 2, the telescoping member 31 and split ring 63 are slid away from the end of the tube 45 to approximately the position shown in FIG. 2. The end of the tube 45 with the O-rings 59 and 61 in place is then positioned in the aperture 27 and axially slid into the small diameter tubular portion 37 thereof, the diameter of the tube 45 being small enough to permit substantial extension of the tube 45 into the small diameter portion 37 even though the tube 25 is canted at an angle to permit the remaining end 47 to be positioned below the aperture 29. Once the tube 45 has been positioned a sufficient distance within the small diameter portion 37 of the aperture 27 to allow the end 47 to clear the aperture 29, as shown in FIG. 2, the tube 25 may be raised at the end 47 and slid axially into the aperture 29, with the O-ring 51 engaging the large diameter tubular portion 41 as shown in FIG. 3.

The telescoping member 31 may now be moved axially toward the aperture 27, the inside diameter of the telescoping member 31 engaging and sealing against the pair of O-rings 59, 61. At the same time, the O-ring 69 tightly engages and seals against the large diameter tubular portion 35 of the aperture 27. Once the telescoping member 31 is completely extended, the split ring 63 may be slid along the tube 45 until it resiliently engages in the groove 53 to form a stop which prohibits movement of the telescoping member 31 toward the center of the tube 45.

It can be seen from FIGS. 2 and 3 that the main assembly operation therefore involves insertion of the end of the tube 45, including the O-rings 59 and 61, into the aperture 27 at an angle so that the end 47 clears the aperture 29. The tube 25 is then aligned with the apertures 27 and 29 and moved axially toward the crankcase 15, so that the end 47 enters the large diameter portion 41 of the aperture 29. The telescoping member 31 is then moved axially to the end of the tube 45 to engage the large diameter portion 35 of the aperture 27 to complete the installation. It can be seen from FIG. 3 that the split ring 53 engages the end of the telescoping member 31 so that, once installed, the replacement tube 25 operates identically with the original tube, that is, the extending ribs 49 and 67 prohibit axial movement which would dislodge the tube 25 at either end by abutting, respectively, the shoulders 39 and 33. The O-rings 55 and 57 seal tightly against the inner diameter of the telescoping member 31 so that the tube 45 is completely sealed at each of the apertures 27 and 29. Once in place, the tube 45 extends completely from within the aperture 29 to within the aperture 27 so that structural integrity is maintained.

Use of this tube 25 permits a relatively inexpensive replacement of the oil drain tubes in a Porsche engine without removal of the cylinder heads, while at the same time providing a structurally sound, well sealed unit for conducting oil from the cylinder head 19 to the crankcase 15.

What is claimed is:

1. A replacement oil drain tube for use in interconnecting the aperture on the cylinder head of a Porsche automobile engine with the aperture on the crankcase thereof, each of said apertures including a larger diameter external tubular section separated by a shoulder from a smaller diameter internal tubular section, said apertures being axially aligned but being subject to substantial misalignment during temperature fluctuations of said engine, comprising:
   a main tube having sufficient length to span the distance between said larger diameter sections, a large end located within said larger diameter section of one of said apertures, and a small end centered within said larger diameter section of the other of said apertures;
   a telescoping sleeve surrounding a portion of the length of said main tube adjacent said small end thereof, said telescoping sleeve located within said larger diameter section of the other of said apertures;
   a sealing member positioned on said small end of said main tube, said member sealingly engaging said main tube and said telescoping sleeve;
   means for locking said telescoping sleeve in place on said main tube to prohibit inward axial movement of said small end of said main tube relative said telescoping sleeve;
   said large end and said telescoping sleeve having larger outside diameters than the inside diameter of said smaller diameter internal tubular sections, but smaller outside diameters than said larger diameter internal tubular sections to permit cocking of said large end of said sleeve within said larger diameter internal tubular sections; and
   a pair of resilient O-rings, one positioned between said larger end and said larger diameter section of said one of said apertures, the other positioned between said telescoping sleeve and said larger diameter section of said other of said apertures, said locking means, abuttment of the end of said tube and said telescoping sleeve with said smaller diameter internal tubular sections and frictional engagement of said O-rings forming the sole means of attaching said replacement drain tube to said engine, said O-rings and said sealing member sealing said tube to said cylinder head and said crankcase during said substantial misalignment.

2. A replacement oil drain tube as defined in claim 1 wherein the outer contours of said telescoping sleeve are identical to the outer contours of said large end of said main tube.

3. A replacement oil drain tube as defined in claim 2 wherein each of said outer contours of said telescoping member and said large end include means for supporting said O-rings circumferentially around said members.

4. A replacement oil drain tube as defined in claim 1 wherein said locking means comprises:
   an external annular groove surrounding said main tube; and
   a resilient split ring resiliently engaged in said annular groove and abutting one end of said telescoping sleeve.

5. A method of replacing an oil drain tube in a Porsche automobile engine to interconnect the aperture on the cylinder head thereof with the aperture on the crankcase thereof, each of said apertures including a larger diameter external tubular section separated by a shoulder from the smaller diameter internal tubular section, said apertures being axially aligned but being subject to substantial misalignment during temperature fluctuations of said engine, with a replacement oil drain tube having a main tube of sufficient length to span the distance between said larger diameter sections, a large end, a small end, a telescoping sleeve slideable on said main tube for selectively increasing the diameter of said small end, a sealing member positioned on said small end of said drain tube to sealingly engage said telescoping sleeve, and means for locking said telescoping sleeve on said main tube, said large end and said telescoping sleeve having smaller outside diameters than said larger diameter tubular sections and being fitted with O-rings seals having larger outside diameters than said larger diameter tubular sections, comprising:
   inserting said small end into said smaller diameter internal tubular section of one of said apertures while canting said replacement tube so that said large end clears the other of said apertures, all while said telescoping sleeve is spaced from said small end;
   aligning the axis of said replacement oil drain tube with said apertures;
   inserting said large end into the larger diameter external tubular section of the other of said apertures to seal said O-ring against said larger diameter tubular section while withdrawing said small end from said smaller diameter section of said one of said apertures to a position within the larger diameter section of said one of said apertures;
   sliding said telescoping sleeve on said main tube to increase the diameter of said small end and engage said sealing member between said telescoping sleeve and said main tube to seal said members, while placing said O-ring on said telescoping sleeve in sealing engagement with the larger diameter section of said one of said apertures; and locking said telescoping sleeve in place on said main tube after sliding said telescoping sleeve to prohibit inward axial movement of said small end of said main tube relative said telescoping sleeve, said sliding and locking steps providing an oil drain tube which is solely resiliently supported by said O-rings and said sealing member and which is limited as to axial movement by said smaller diameter tubular sections and said locking means.

6. A method of replacing an oil drain tube as defined in claim 5 wherein said locking step comprises:

inserting a resilient split ring into a groove in said main tube, said split ring resiliently engaging said groove and abutting said telescoping sleeve.

* * * * *